Sept. 12, 1933.                H. C. WELLMAN                1,926,862
                          MOTION PICTURE APPARATUS
                       Filed Nov. 20, 1931      5 Sheets-Sheet 3

INVENTOR
Howard C. Wellman
BY
ATTORNEYS

Sept. 12, 1933.   H. C. WELLMAN   1,926,862
MOTION PICTURE APPARATUS
Filed Nov. 20, 1931   5 Sheets-Sheet 4

INVENTOR
Howard C. Wellman
BY
ATTORNEYS

Patented Sept. 12, 1933

1,926,862

UNITED STATES PATENT OFFICE 1,926,862

MOTION PICTURE APPARATUS

Howard C. Wellman, Rochester, N. Y., assignor to Eastman Kodak Company, Rochester, N. Y., a corporation of New York Application November 20, 1931
Serial No. 576,261

22 Claims. (Cl. 88—17)

This invention relates to motion pictures and more particularly to motion picture machines in which film may be wound from one shaft to another. One object of my invention is to provide a power driven machine with equipment which permits the film to be wound either forwardly or rearwardly at a normal speed for either taking or projecting pictures, to provide a machine which will permit the film to remain stationary for projecting or taking stills, and to provide a mechanism with which film may be run in one direction at a speed higher than normal. Another object of my invention is to provide a control for a motion picture apparatus so that the various directions and speeds of film movement can be readily obtained. Another object of my invention is to provide a control of the necessary parts of the motion picture machine so that they will be coordinated and so that damage to the film from incorrect manipulation of the machine controls cannot result. Another object of my invention is to provide a machine with a supply shaft which may be run in one direction for normal operation of the machine at a predetermined speed and which may be run in the same direction at a much higher speed for rewinding film. Still another object of my invention is to provide a novel type of mating wheels which may be moved relative to each other to obtain the various film speeds for winding forwardly and rearwardly, as above mentioned. Still another object of my invention is to provide a control for the mating wheels which will insure the proper and easy operation of the various parts of the machine and other objects will appear from the following specification, the novel features being particularly pointed out in the claims at the end thereof.

For motion picture apparatus and particularly for motion picture projectors, it is desirable to move the film forwardly for projecting at a normal speed and rearwardly for projecting the film at a normal speed backwards. It is also useful to provide a mechanism by which the film may run backwards at a high speed for rewinding and to provide a mechanism by which the film may remain stationary in a film gate for projecting stills. The present invention relates particularly to a machine in which all of these movements can be acomplished and to a control which is constructed and arranged to prevent accidental operation of the machine in such a manner that the film may be damaged.

Certain features of my present invention may be considered as an improvement over the mechanism shown in U. S. Patent No. 1,846,004, Green, February 16, 1932.

Coming now to the drawings, wherein like reference characters denote like parts throughout.

As a typical embodiment of my invention, I have shown a projector equipped to drive the film forwardly at a normal speed for projecting, to drive the film rearwardly at a normal speed for projecting, to drive the film rearwardly at a high speed for rewinding and to hold the film stationary in the gate for projecting stills. Quite obviously many of the features of my invention can be applied to a camera as well as to a projector.

In the form shown in the drawings, a projector may consist of a base 1, from which a housing 2 extends upwardly, an arm being hinged at 3, this arm 4, carrying a shaft 5 on which a reel 6 for carrying film may be mounted. On the lower part of the housing 2 there is a pivotal support 7 for an arm 8 which supports a shaft 9 which may carry a reel 10. Normally, the reel 6 and the shaft 5 are called a supply reel and shaft and the reel 10 and the shaft 9 are called a take-up reel and shaft. In the normal operation of the machine, film is drawn from reel 6 and is passed about a sprocket 11 lying beneath the presser member 12 which, by means of rollers 13, holds the film on the sprocket teeth 14. From this sprocket the film is looped through the gate designated broadly as 15 and consisting of a relatively fixed gate member 16 and a relatively movable gate member 17, the latter being movable upon a pivot 18 when the latch member 19 is released. The film is drawn through this gate member by means of a claw 20 which may be of any well-known variety and which intermittently engages the film to move it intermittently through the gate. A second sprocket 97 similar to sprocket 11 is mounted on a shaft 21 to which there is also affixed a hand-wheel 22 by which the shaft may be manually turned as is occasionally useful in threading a machine of this kind.

Since my invention relates particularly to the drive for shafts 5 and 9 and its control by which the drive may be operated, this drive will now be described, referring particularly to Fig. 2.

The machine is preferably driven by power by means of a motor 23 which turns a pulley 24, a belt 25 and a mating wheel which is turned by means of the pulley 26. This mating wheel 27, as shown in Fig. 4, is co-axial with the pulley 26 on shaft 28, and shaft 28 also extends beyond the bearing 29 so that it may carry the twin mating wheels 30.

Figure 1:
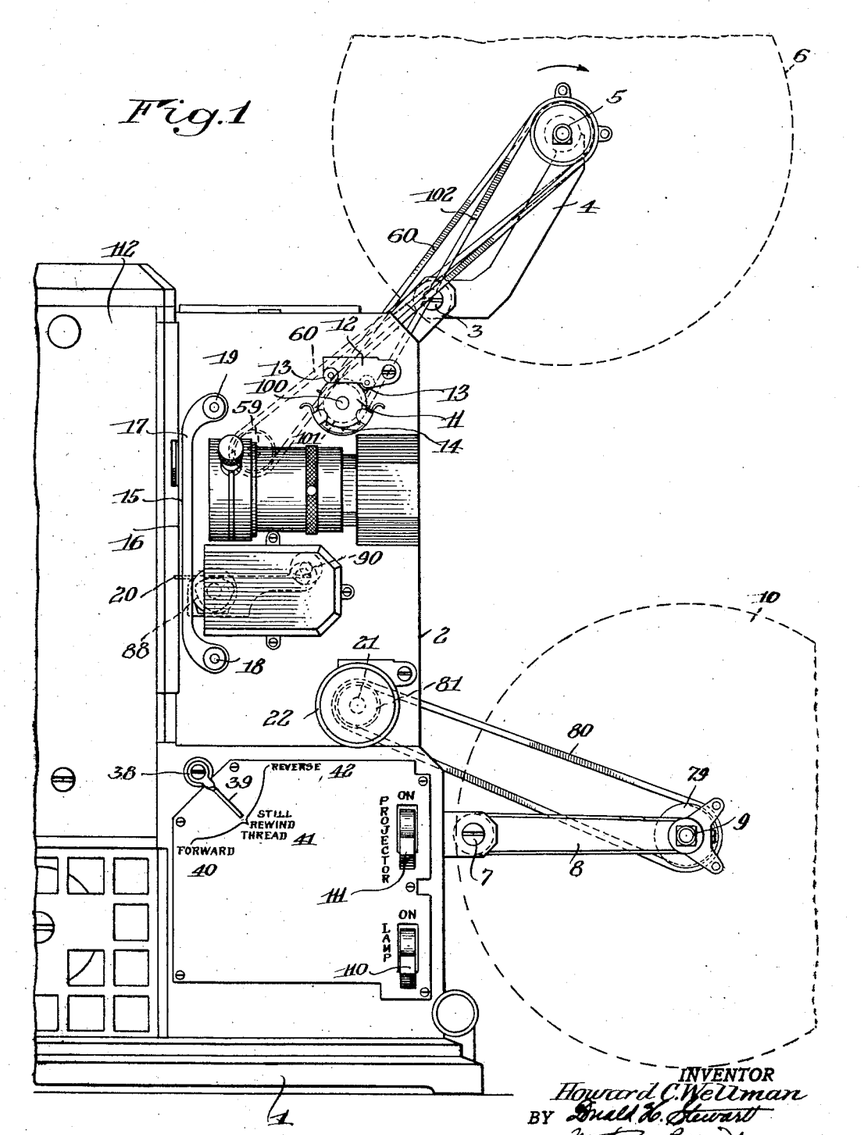
Fig. 1 is a side elevation of a projector which is constructed in accordance with and which illustrates a preferred embodiment of my invention, parts of the projector being broken away.

The shaft 28 and the bearing 29 are carried by the movable bracket 31 which is pivoted at 32 to the machine frame 53 and which is provided with an offset flange 34 supporting an arm 35 having a rack 36 cut in the lower edge thereof, this rack being adapted to mesh with the pinion 37 carried by a shaft extending through the housing 2 and terminating at 38 in an operating handle 39, as best shown in Fig. 1. As is also shown in this figure, the handle 39 may be moved to stations 40, 41 and 42, station 40 indicating the normal forward operation of the machine, station 41 the position of the handle 39 for rewinding, threading or still pictures, and station 42 the position of the handle 39 for reverse projecting operations of the machine. By moving the handle 39, the pinion 37 adjusts the movable bracket 31 and consequently the position of the mating wheels 28 and 30.

Figure 3:
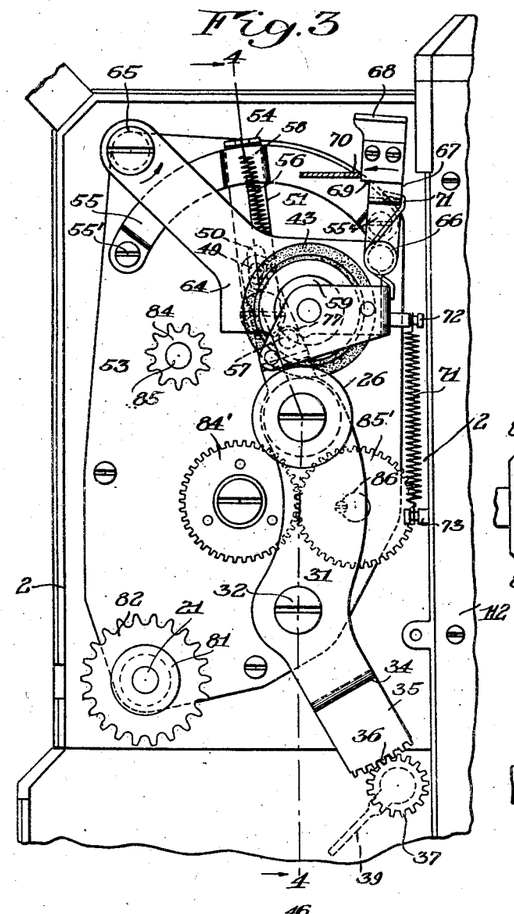
Fig. 3 is a fragmentary detail of the projector showing on a large scale the mating wheels and the control therefor.
Figure 4:
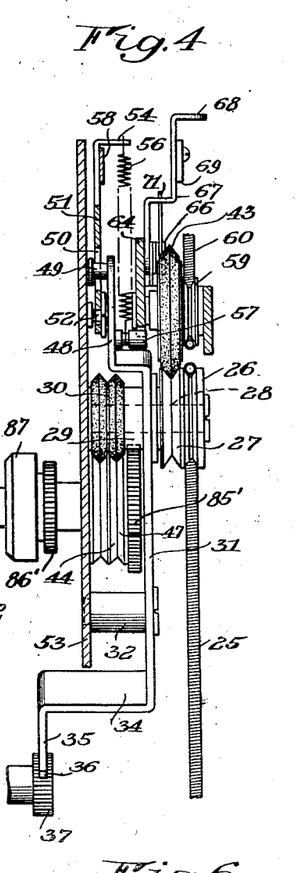
Fig. 4 is a section on line 4—4 of Fig. 3, showing partially in section and partially in elevation the mating wheels.
Figure 5:
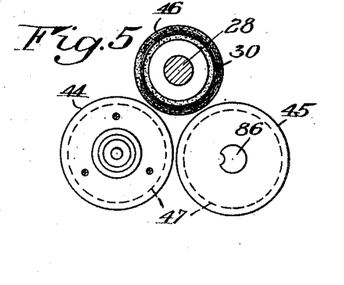
Fig. 5 is a fragmentary detail view of the mating wheels in a non-driving relation.

Referring to Figs. 3 and 4, the mating wheels 28 may be moved by bracket 31 into engagement with a mating wheel 43. The mating wheels 30 may be engaged with mating wheels 44 or mating wheels 45, as best shown in Fig. 5.

While I have shown these pairs of mating wheels to be of V-shape in cross-section, and to have frictional engagement with each other, obviously sharp-toothed gears could be used if desired, or any other suitable friction type of wheel could be used.

I have found, however, that an entirely satisfactory driving connection can be made where one mating wheel has a cork surface 46 and where this wheel is adapted to engage into a complementary shaped metallic groove as 47, as in the mating wheels 44 or 45.

Figure 7:
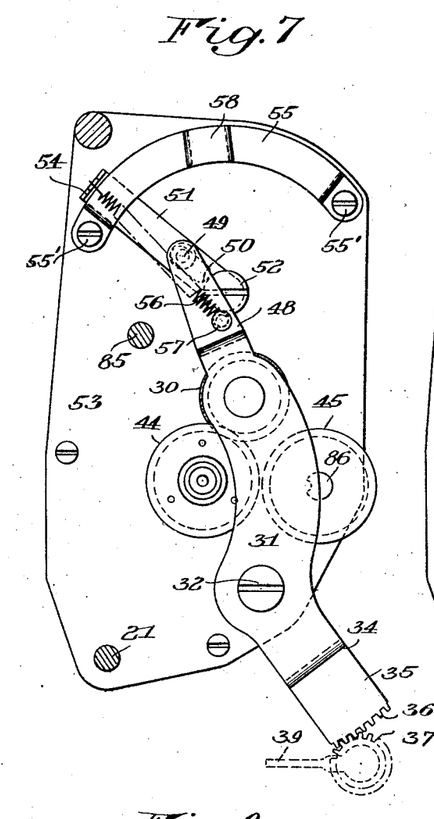
Fig. 7 is an enlarged fragmentary side elevation of the control for the mating wheels, the control being in position for driving the film rearwardly at a normal speed.
Figure 8:
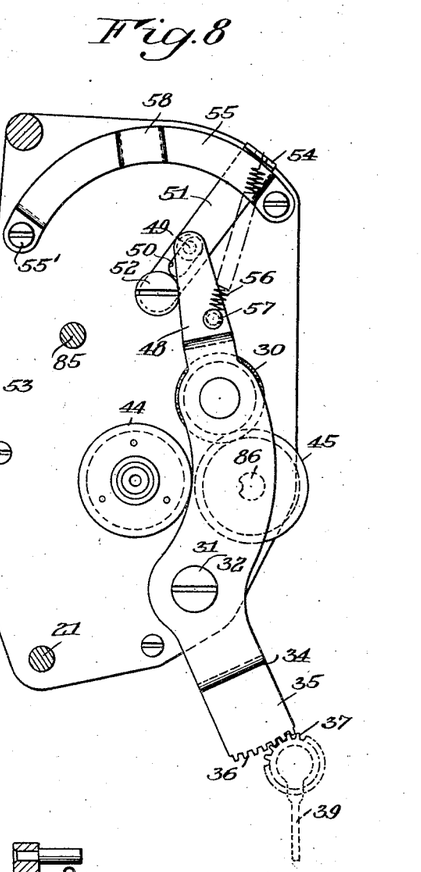
Fig. 8 is a view similar to Fig. 7 but with the parts in position for driving the film forwardly.

As best shown in Figs. 7 and 8, the mating wheel 30 is made to engage with the mating wheel 45 when the parts are to be driven in a forward direction and the same wheel is made to engage with the wheel 44 when the machine is to be driven in a reverse direction, this being accomplished by moving the bracket 31 upon its pivot 32 by means of the rack 36 and the pinion 37, all as above described.

It is, of course, necessary to hold the mating wheels in contact for proper driving relation and preferably to hold them in resilient contact. Consequently, I prefer to provide the mechanism which will now be fully described. On the upper end of the movable bracket 31 there is an arm 48 on which there is mounted a pin 49. This pin normally engages a slot 50 carried by an arm 51 pivotally attached at 52 to the frame plate 53 and having an offset turned-over edge 54, as best shown in Fig. 4. This arm may turn upon its pivot 52 between the frame plate 53 and the guard plate 55 which is attached to the plate 53 by means of a pair of screws 55' the central portion of the guide plate being spaced from plate 53 a distance sufficient to permit the arm 51 to move freely. A spring 56 connects a stud 57 on the movable arm 31 with the turned-over flange 54 on the end of arm 51. Consequently, when the arm 51 is in the position shown either in Fig. 7 or Fig. 8, the spring resiliently tends to hold the mating wheel 30 in contact with its cooperating wheel 44 or 45, and thus a resiliently driving connection is obtained.

For some purposes, as for projecting rearwardly at a high speed, or for allowing the film to remain stationary while the motor continues to move, it is desirable to have the mating wheel in the position shown in Fig. 5. This is, out of engagement with both of the mating wheels 44 and 45.

This central position can be obtained by having the handle 51 become seated in the offset notch 58 which lies in the central portion of the guideway 55. This offset portion 58 is of a width to receive the arm 51 which can be made to snap into this notch and serves to hold the mating wheels in the position shown in Fig. 5, in which the movable arm 31 is positioned, as is also shown in Fig. 3. When in this position, it is obvious that wheel 30 does not transmit motion to either of the mating wheels 44 or 45.

Figure 9:
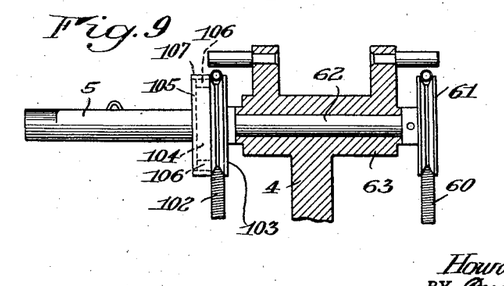
Fig. 9 is an enlarged sectional view through the upper shaft of a projector normally known as the supply shaft.

For rewinding film at high speed, the mating wheel is in the position shown in Fig. 3 and in this position it may contact with the mating wheel 43, this wheel carrying a pulley 59, as best shown in Fig. 4, and this pulley may be connected by means of a belt 60 to the pulley 61—see Fig. 9—which is attached to a shaft 62 which turns freely in a bearing 63 carried by the arm 4 and which terminates in a shaft 5 of suitable configuration to drive the supply spool 6.

It is necessary to control the relation of the mating wheel 43 to the mating wheel 27. This is done in the following manner. Mating wheel 43 is carried by a bracket 64 pivotally mounted at 65 to the plate 53 and also pivotally attached at 66 to a spring latch 67 terminating in a finger grip 68. This finger grip can be readily seen in Fig. 3 and may be manually manipulated to release the cooperating locking flanges 69 and 70, as best shown in Fig. 3. The latch is normally turned in the direction shown by the arrow in this figure, by means of a spring 71, so that when the handle 68 is raised up and the parts are brought into engagement with flange 69 resting on flange 70, bracket 64 is lifted to such an extent that the mating wheel 43 and the mating wheel 28 cannot contact. It is this position that the parts assume when the handle 39 is turned to the position 41 on the scale shown in Fig. 1. When in this position the machine is in position to project stills since the film driving mechanism is not movably connected to the motor 23.

Figure 2:
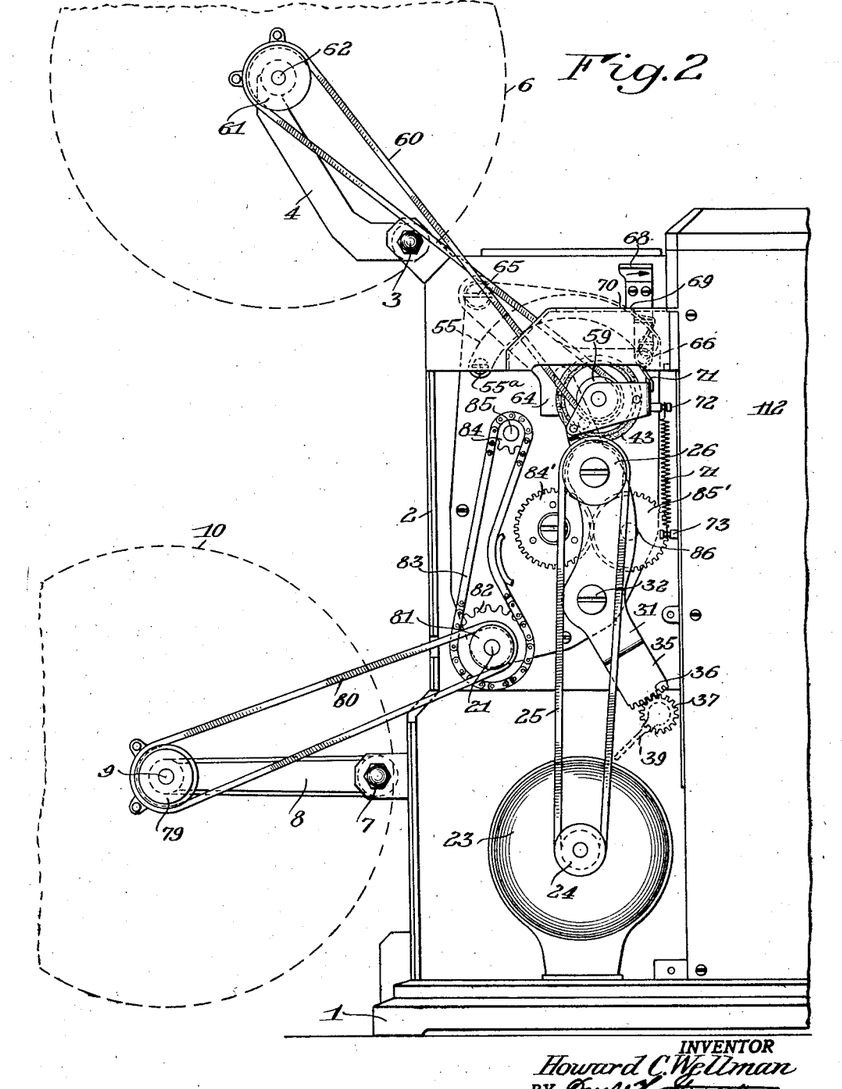
Fig. 2 is a side elevation of the projector shown in Fig. 1 but taken from the opposite side with a cover-plate which normally encloses the operating mechanism removed.

With the lever 39 in the same position, the machine can be made to rewind the film by thrusting the finger grip 68 in the direction shown by the arrow in Fig. 2. This will permit the latch 69—70 to release the bracket 64, enabling the spring 71 to resiliently pull down the mating wheel 43 into contact with the mating wheel 27. The spring 71 connects pin 72 on the bracket 64 to a pin 73 on the housing 2 of the machine, so that there is always a tendency for this spring to draw the bracket downwardly or to rotate the bracket upon its pivot 65 in the direction shown by the arrow in Fig. 3.

It is desirable, however, to definitely locate the mating wheel 43 in such a position that the wheel cannot be made to come into driving relation with the mating wheel 27, if the mating wheel 30 should be in contact with either of the mating wheels 44 and 45, because if this should happen, two forces would act upon the film, tending to move different parts of it at different speeds, which would, of course, destroy the film.

Figure 6:
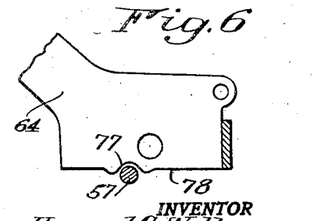
Fig. 6 is a fragmentary side elevation of a device for controlling and carrying one of the mating wheels.

To accomplish this result, the lever 64 bears on its lower edge a cam surface 78, as best shown in Fig. 6. This cam surface permits the mating wheel 43 to reach a driving position only when a pin 57 lies in the highest cut-out portion 77 of the cam surface. At all other positions along the cam surface 78 the mating wheel is prevented from reaching a driving relation, while mating wheel 27 is in contact with cooperating mating wheels 44 and 45.

Not only does the cam 78 have the function of permitting the mating wheel 43 to contact with mating wheel 49 only in one position of the latter, but it also, through the shape of the cam 78, tends to form a snap latch which assists arm 51 in assuming and being retained in the proper position to resiliently hold the mating wheels in driving relation.

The shape of cam 78 is also such that the movable bracket 64, except when the pin 57 is entered in the notch 77, is turned about its pivotal point 65, and is raised to such an extent that the latch formed by the cooperating parts 69—70 will always be engaged. Consequently, when the lever 39 is moved to adjust the mating wheels for the various positions, the mating wheel 43 is constantly held away from engagement with mating wheel 28, except when the latch is deliberately released. It will stay released only while the bracket 64 is in the neutral position, that is, in the position shown in Fig. 5 wherein the handle 39 is moved to position 41 of the scale. In this position the cam 78 permits the mating wheel 43 to engage with the mating wheel 28 when the latch 68 is removed. However, as soon as handle 39 is moved from the neutral position, the cam 78 immediately raises the bracket 64 and thus causes the latch 69—70 to automatically engage and retain the bracket 64 in its raised position until the parts are definitely released by releasing the latch for another film rewinding.

The take-up reel 10 is mounted upon the shaft 9, which may drive the reel 10 in the following manner. Shaft 9 is preferably of a configuration to drivably engage a reel 10. Any well-known type of key way or other driving device may be employed. Shaft 9 is carried by a bearing in arm 8 and on the opposite side from this bearing in Fig. 1 there is a pulley 79 which is connected by means of a belt 80 to a pulley 81 contained in the housing 2, and best shown in Fig. 2. This pulley is carried by a shaft 21 on which there is also mounted a sprocket wheel 82, this sprocket wheel being connected by means of a chain 83 to a second sprocket wheel 84 on a shaft 85.

Figure 10:
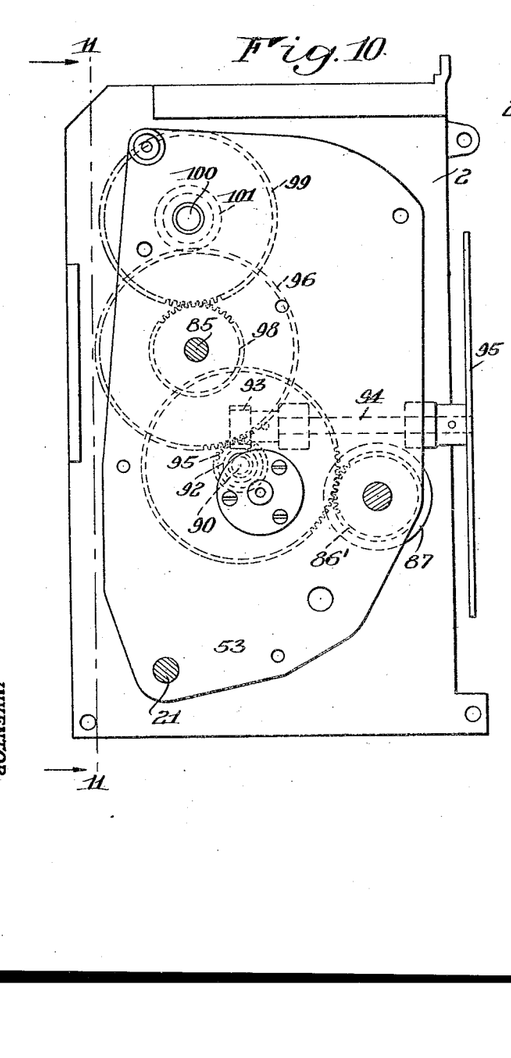
Fig. 10 is a side elevation of a portion of the gearing of the projector shown in Fig. 1 showing the drive leading to the shutter.
Figure 11:
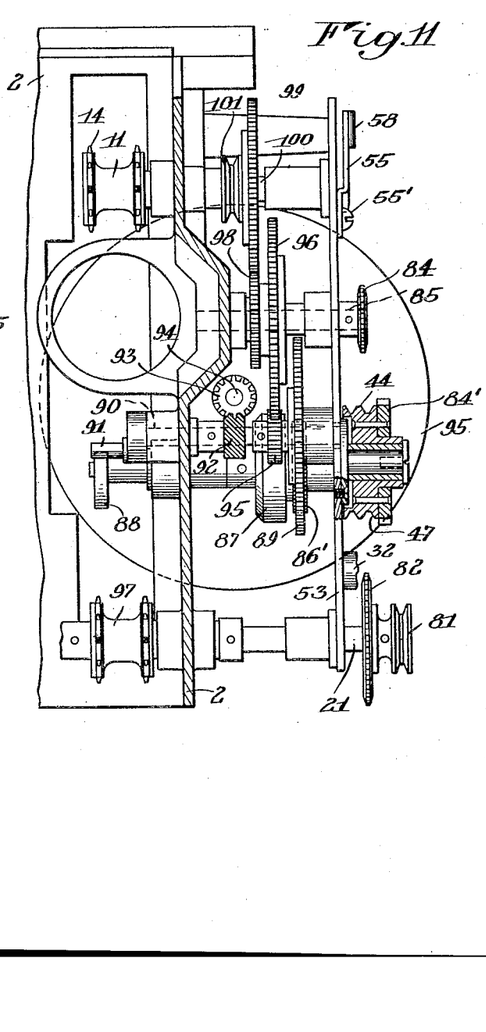
Fig. 11 is a section on line 11—11 of Fig. 10 with some of the parts being shown in elevation for the sake of clearness.

Shaft 85, as best shown in Figs. 10 and 11, receives power through the following gear train. For driving the film forwardly, that is, for winding film up on reel 10 at normal speed, the mating wheel 30 engages and drives mating wheel 45. Mating wheels 45 and 44 are geared together, as shown in Fig. 3, by means of the gear wheels 84' and 85', the latter being attached to mating wheel 45 and the former being attached to mating wheel 44. Gear 85' and mating wheel 45 are both carried by shaft 86, as best shown in Fig. 3, this shaft extending through a mechanism plate and also carrying a gear 86' (Fig. 11), a small fly wheel 87, and a cam 88, which is used to operate the front end of the pull-down claw 20. Gear 86' meshes with a large gear 89 carried by the shaft 90, this shaft operating an eccentric 91 which operates the rear end of the pull-down claw 20.

A bevelled gear 92 is also attached to shaft 90, this bevelled gear meshing with a second bevelled gear 93 carried by a shaft 94, this shaft extending forwardly through the housing 2 and supporting the shutter 95.

Also mounted on shaft 90 is a pinion 95 meshing with the large gear 96 carried by shaft 85. Shaft 85 supports the sprocket wheel 84 which is connected by means of a chain 83 to the sprocket wheel 82 attached to shaft 21. A pulley 81 is also attached to this shaft and from this pulley power is derived through the belt 80 to drive the take-up shaft 9. Also mounted on shaft 21 is a film sprocket 97 which is similar to the upper film sprocket 11.

Shaft 85 in addition to gear 96 also supports a gear 98 meshing with a gear 99 on shaft 100, shaft 100 passing through suitable supports and carrying the sprocket 11. Shaft 100 also supports a pulley 101, from which the belt 102 extends upwardly to engage the pulley 103, as best shown in Fig. 9, which is connected to shaft 62 through any standard type of one-way clutch 104.

I prefer to use for this purpose a star wheel 105 with rollers 106, which will impinge upon the flange 107 of wheel 103 when this wheel is driven in a counter-clockwise direction. The function of the two drive wheels shown in Fig. 9 for the shaft 62 is as follows. For normal reverse winding, as for projecting pictures rearwardly, the shaft 62 is driven in a counter-clockwise direction at normal speed through the belt 102 and pulley 103. When the shaft 62 is to be driven at a high speed for rewinding, it is driven through the belt 60 and pulley 61. Since there is a one-way clutch between the pulley 103 and shaft 62, and since pulleys 103 and 61 both are for driving the shaft 62 in the same direction, when pulley 61 is driven at a high speed, the one-way clutch permits the shaft to turn much faster than pulley 103. Thus there can be no chance for the two pulleys to attempt to drive the same shaft at different speeds.

With a machine constructed in accordance with the above described embodiment of my invention, the structure of the mechanism for operating the reels, pull down, film sprockets, and other film moving parts, are all arranged under a control which makes it impossible to improperly operate the machine or impossible to damage the film by not using the proper controls for the movement desired.

The operation of the machine may be reviewed preferably as follows: After film has been threaded from a supply reel 6 to a take-up reel 10 in the usual manner by passing the film over the sprocket 11 through the film gate 16—17, past a pull-down claw 20, over the sprocket 97, and onto the reel 10, the operator moves lever 39 to the forward position. Switch 110 which controls the lamp in the lamp housing 112 must be turned on and switch 111 which controls the circuit to the motor 23 must be turned on. The projector then will pass the film through the machine at a normal rate of speed in a forward direction.

If the operator desires to view a still picture, lever 39 is moved to the position 41 in which the pulldown claw 20 will be disengaged from the power drive, and will permit the film to remain stationary. The machine may then be run forwardly or rearwardly by moving lever 39 to position 40 or 42.

After the film has been completely wound on reel 10, it may be desirable to rewind the film on reel 6. For this purpose the lever 39 is moved to position 41 and, in addition, it is necessary for the operator to release the spring latch 69—70. Since the mating wheel 46 has been moved to a neutral position by the movement of lever 39, the cam 78 and its contacting pin 57, permits the bracket 64 to engage mating wheel 43 with wheel 28, thus causing the shaft 5 to be driven at a high speed through belt 60 and pulley 61.

After the rewinding is complete, the machine may be again re-threaded by engaging the snap latch 69—70 if lever 39 is permitted to remain at position 42. However, if desirable, the lever 39 could be moved to either reverse or forward position and this movement would automatically engage the latch 69—70 and by returning lever 39 to position 41, the machine could be threaded without any of the power drives affecting the parts engaging the film. Thus it will be seen that the control is such that it is practically impossible to damage the film by the improper operation of the control members.

While I have described my invention as particularly adapted for use on projecting machines, it is quite obvious that certain features of the invention are equally useful for cameras. It is therefore to be understood that the embodiment shown in the drawings and described herein is by way of illustration only, and I contemplate as within the scope of my invention any forms thereof which may come within the terms of the appended claims.

What I claim is:

1. In a motion picture machine, the combination with a power drive, of shafts adapted to support film reels, connections between the shafts and the power drive including a pair of intergeared wheels, a single wheel spaced from the intergeared wheels, a driving wheel for transmitting movement to one of the intergeared wheels or to the single wheel, and means for moving the driving wheel into three positions, one into driving relation with one intergeared wheel, a second, into a position out of driving engagement with both intergeared wheels in which it may engage said single wheel, a third into driving relation with the other intergeared wheel, and means for retaining said driving wheel in said positions.

2. In a motion picture machine, the combination with a power drive, of shafts adapted to support film reels, connections between the shafts and the power drive including a pair of intergeared wheels, a driving wheel for transmitting movement to either of the intergeared wheels, and means for moving the driving wheel into three positions, one into driving relation with one intergeared wheel, a second, into a position out of driving engagement with both intergeared wheels, a third into driving relation with the other intergeared wheel, and means including a swinging latch pivoted to the machine, having sliding engagement with the means for moving the driving wheel and having three latching elements, the engagement of any one of which may retain the driving wheel in a corresponding position.

3. In a motion picture machine, the combination with a power drive, of shafts adapted to support film reels, connections between the shafts and the power drive including a pair of intergeared wheels, a driving wheel for transmitting movement to either of the intergeared wheels, and means for moving the driving wheel including a pivoted bracket carrying said driving wheel and a second pivoted lever operably connected to the bracket to alter the position of said driving gear.

4. In a motion picture machine, the combination with a power drive, of shafts adapted to support film reels, connections between the shafts and the power drive including a pair of intergeared wheels, a driving wheel for transmitting movement to either of the intergeared wheels, and means for moving the driving wheel including a pivoted bracket carrying said driving wheel and a second pivoted lever operably connected to the bracket to alter the position of said driving gear, and a latching device adapted to cooperate with one of a plurality of latching devices to hold said bracket in a set position.

5. In a motion picture machine, the combination with a power drive, of shafts adapted to support film reels, connections between the shafts and the power drive including a pair of intergeared wheels, a driving wheel for transmitting movement to either of the intergeared wheels, and means for moving the driving wheel including a pivoted bracket carrying said driving wheel and a second pivoted lever operably connected to the bracket through a rack and pinion for transmitting motion from said lever to said bracket.

6. In a motion picture machine, the combination with a power drive, of shafts adapted to support film reels, connections between the shafts and the power drive including a pair of intergeared wheels, a driving wheel for transmitting movement to either of the intergeared wheels, and means for moving the driving wheel including a pivoted bracket, a lever pivoted off-center with respect to the bracket, operable connections between the lever and bracket and a spring attached to the bracket and tending to move the lever and bracket to predetermined positions.

7. In a motion picture machine, the combination with a power drive, of shafts adapted to support film reels, connections between the shafts and the power drive including a pair of intergeared wheels, a driving wheel for transmitting movement to either of the intergeared wheels, and means for moving the driving wheel including a pivoted bracket, a lever pivoted off-center with respect to the bracket, operable connections between the lever and bracket and a spring attached to the bracket and adapted to exert a force on said lever when said lever is moved to either side of the pivotal supports for the bracket and lever.

8. In a motion picture machine, the combination with a power drive, of shafts adapted to support film reels, connections between the shafts and the power drive including a pair of intergeared wheels, a driving wheel for transmitting movement to either of the intergeared wheels, and means for moving the driving wheel including a pivoted bracket, a lever pivoted off-center with respect to the bracket, operable connections between the lever and bracket and a spring attached to the bracket and adapted to exert a force on said lever when said lever is moved to either side of the pivotal supports for the bracket and lever, said spring also being adapted to lie parallel to the two pivotal supports without tending to turn said lever.

9. In a motion picture machine, the combination with a power drive, of shafts adapted to support film reels, connections between the shafts and the power drive including a plurality of wheels adapted to be driven, a movably mounted driving wheel adapted to drive one of the plurality of wheels through contact therewith, and a manually operable member for moving one of the plurality of wheels to and from a position in which it may be driven by the driving wheel.

10. In a motion picture machine, the combination with a power drive, of shafts adapted to support film reels, connections between the shafts and the power drive including a plurality of wheels adapted to be driven, a driving wheel adapted to drive one of the plurality of wheels through contact therewith, a movable mount for the driving wheel, means for moving the mount to position the driving wheel in contact with one of the wheels adapted to be driven, and means for moving one of the wheels adapted to be driven into a position to contact with the driving wheel.

11. In a motion picture machine, the combination with a power drive, of shafts adapted to support film reels, connections between the shafts and the power drive including a plurality of wheels adapted to be driven, a driving wheel adapted to drive one of the plurality of wheels through contact therewith, a movable mount for the driving wheel adapted to move the wheel through a fixed path, and means to move one of the plurality of wheels adapted to be driven into the path of the driving wheel for establishing a driving connection therewith.

12. In a motion picture machine, the combination with a power drive, of shafts adapted to support film reels, connections between the shafts and the power drive including a plurality of wheels adapted to be driven, a driving wheel adapted to drive one of the plurality of wheels through contact therewith, a movable bracket for the driving wheel, a cam element and cam follower element for controlling the position of one of the wheels adapted to be driven relative to the driving wheel, whereby premature engagement between the driving and driven rollers is prevented.

13. In a motion picture machine, the combination with a power drive, of shafts adapted to support film reels, connections between the shafts and the power drive including a plurality of wheels adapted to be driven, a driving wheel adapted to drive one of the plurality of wheels through contact therewith, a movable bracket for the driving wheel, a cam element and cam follower element for controlling the position of one of the wheels, one of said elements being carried by the movable bracket for the driving wheel, whereby the relative positions of the driving wheel and one driven wheel may be controlled by the driving wheel bracket.

14. In a motion picture machine, the combination with a power drive, of shafts adapted to support film reels, connections between the shafts and the power drive including a plurality of wheels adapted to be driven, a driving wheel adapted to drive one of the plurality of wheels through contact therewith, a movable bracket for the driving wheel, a cam element and cam follower element for controlling the position of one of the wheels, one of said elements being carried by the movable bracket for the driving wheel, whereby the relative positions of the driving wheel and one driven wheel may be controlled by the driving wheel bracket and a supplemental control member for moving said driven wheel into contact with the driving wheel.

15. In a motion picture machine, the combination with a power drive, of shafts adapted to support film reels, connections between the shafts and the power drive including a plurality of wheels adapted to be driven, a driving wheel adapted to drive one of the plurality of wheels through contact therewith a movable bracket for the driving wheel, a cam element and cam follower element for controlling the position of one of the wheels, one of said elements being carried by the movable bracket for the driving wheel, whereby the relative positions of the driving wheel and one driven wheel may be controlled by the driving wheel bracket and a supplemental control member comprising a latch normally holding said driven wheel from contact with said driving wheel, and means under the control of the cam element and cam follower element for releasing the latch to engage said driven and driving wheels.

16. In a motion picture machine, the combination with a power drive, of shafts adapted to support film reels, connections between the shafts and the power drive including a plurality of wheels adapted to be driven, a driving wheel adapted to drive one of the plurality of wheels through contact therewith, a movable bracket for the driving wheel, a cam element and cam follower element for controlling the position of one of the wheels, one of said elements being carried by the movable bracket for the driving wheel, whereby the relative positions of the driving wheel and one driven wheel may be controlled by the driving wheel bracket and a supplemental control member comprising a latch normally holding said driven wheel from contact with said driving wheel, and means under the control of the cam element and cam follower element for releasing the latch to engage said driven and driving wheels and means under the control of said movable bracket, cam element and cam follower element for latching said driven wheel out of engagement with said driven wheel.

17. In a motion picture machine, the combination with a power drive, of shafts adapted to support film reels, one to support a take-up reel and the other to support a supply reel, means for driving one of said shafts in the same direction at two different speeds, including two wheels adapted to be driven at different speeds by a driving wheel, two of the three wheels being movably mounted with respect to each other, and means including a cam and cam follower for controlling the movement of one wheel whereby power may be applied through only one driven wheel at a time through the driving wheel.

18. In a motion picture machine, the combination with a power drive, of shafts adapted to support film reels, one to support a take-up reel and the other to support a supply reel, means for driving one of said shafts in the same direction at two different speeds, including two wheels adapted to be driven from a single driving wheel connected to said source of power, one of the two wheels adapted to be driven being movably mounted, a latch member for holding said movably mounted wheel away from the driving wheel, a movable bracket for carrying the driving wheel, connections between the two movable mounts for positioning the latch in an operative position in which it may be released to engage the movably mounted wheels.

19. In a motion picture machine, the combination with a power drive, of shafts adapted to support film reels, one to support a take-up reel and the other to support a supply reel, means for driving one of said shafts in the same direction at two different speeds, including two wheels adapted to be driven from a single driving wheel connected to said source of power, one of the two wheels adapted to be driven being movably mounted, a latch member for holding said movably mounted wheel away from the driving wheel, a movable bracket for carrying the driving wheel, connections between the two movable mounts for positioning the latch in an operative position in which it may be released to engage the movably mounted wheels, said connections locking said latch member against releasing at all other positions of the movable mounts.

20. In a motion picture machine, the combination with a power drive, of supply and take-up shafts adapted to support film reels, connections between said shafts and the power drive including gearing connected to the power drive and shafts for driving each shaft in one direction, and a supplemental driving connection between one shaft, and the motor through gearing for driving one of said shafts at an accelerated speed in the same direction as the first mentioned drive for the same shaft.

21. In a motion picture machine, the combination with a power drive, of supply and take-up shafts adapted to support film reels, connections between said shafts and the power drive including gearing connected to the power drive and shafts for driving each shaft in one direction, supplemental gearing movable to and from an operative driving relation with the motor for driving one shaft in the same direction at a higher speed, and control members normally holding the high speed driving gearing out of operative relation with the motor.

22. In a motion picture machine, the combination with a power drive, of supply and take-up shafts adapted to support film reels, connections between said shafts and the power drive including gearing connected to the power drive and shafts for driving each shaft in one direction, two pulleys mounted on one shaft, a one way clutch between one pulley and the shaft, operable connections between the pulleys and the power driven gearing adapted to drive both pulleys in one direction, and high speed gearing connectable to the power drive and to one pulley, means for connecting the power drive to turn the shaft at a high speed, the one way clutch and pulley being always connected to the power drive whereby the shaft may freely turn at a higher speed than the speed the power drive turns the pulley connected to the shaft through the one way clutch.

HOWARD C. WELLMAN.